(12) United States Patent
Mukhopadhyay

(10) Patent No.: US 10,498,533 B2
(45) Date of Patent: Dec. 3, 2019

(54) METHODS, SYSTEMS, AND COMPUTER READABLE MEDIA FOR INCREASING THE RATE OF ESTABLISHED NETWORK CONNECTIONS IN A TEST SIMULATION ENVIRONMENT

(71) Applicant: Keysight Technologies Singapore (Sales) Pte. Ltd., Singapore (SG)

(72) Inventor: Debapriyay Mukhopadhyay, Kolkata (IN)

(73) Assignee: Keysight Technologies Singapore (Sales) Pte. Ltd., Singapore (SG)

(*) Notice: Subject to any disclaimer, the term of this patent is extended or adjusted under 35 U.S.C. 154(b) by 362 days.

(21) Appl. No.: 15/382,109

(22) Filed: Dec. 16, 2016

(65) Prior Publication Data

US 2018/0176020 A1 Jun. 21, 2018

(51) Int. Cl.
  *H04L 9/32* (2006.01)
  *H04L 9/14* (2006.01)
  *H04L 9/30* (2006.01)
  *H04L 9/08* (2006.01)

(52) U.S. Cl.
  CPC ............ *H04L 9/302* (2013.01); *H04L 9/0825* (2013.01); *H04L 9/3033* (2013.01)

(58) Field of Classification Search
  CPC ...... H04L 9/302; H04L 9/0825; H04L 9/3033
  See application file for complete search history.

(56) References Cited

U.S. PATENT DOCUMENTS

| | | | | |
|---|---|---|---|---|
| 6,243,466 B1* | 6/2001 | Young | ................... | H04L 9/0894 380/277 |
| 7,054,905 B1* | 5/2006 | Hanna | ................. | G06Q 10/107 709/206 |
| 7,136,484 B1* | 11/2006 | Koh | ....................... | H04L 9/0662 380/28 |
| 7,352,867 B2* | 4/2008 | Medvinsky | ............. | H04L 9/083 380/278 |
| 8,302,160 B2* | 10/2012 | Hofmann | .............. | H04L 9/3247 713/182 |

(Continued)

OTHER PUBLICATIONS

Schneier, "Chapter 19: Public—Key Algorithms," Applied Cryptography, Second Edition, Protocols, Algorithms, and Source Code in C, pp. 461-482 (1996).

*Primary Examiner* — Yonas A Bayou

(57) ABSTRACT

Methods, systems, and computer readable media for increasing the rate of established network connections in a test simulation environment are disclosed. The method includes generating, by a network equipment test device in a test simulation environment, a random integer. The method further includes designating the generated random integer as a first twin prime value in the event the generated random integer is a prime number and designating, by the network equipment test device, a generated sum of the first twin prime value and a designated value as a second twin prime value in the event the generated sum is a prime number. The method also includes generating a custom key certificate pair that includes a public encryption key and a private decryption key using the first twin prime value and the second twin prime value and decrypting at least one message received from a device under test using the private decryption key.

20 Claims, 4 Drawing Sheets

(56) References Cited

U.S. PATENT DOCUMENTS

| | | | | |
|---|---|---|---|---|
| 8,316,422 B2* | 11/2012 | Hofmann | ............ | H04L 9/3247 |
| | | | | 726/10 |
| 8,321,678 B2* | 11/2012 | Hofmann | ............ | H04L 9/3247 |
| | | | | 713/161 |
| 9,252,955 B2* | 2/2016 | Chamberlin | ............ | G06F 21/31 |
| 9,633,210 B2* | 4/2017 | Ferguson | ............ | G06F 21/602 |
| 9,847,977 B2* | 12/2017 | Freeman | ............ | H04L 63/0442 |
| 10,013,728 B2* | 7/2018 | Schechter | ............ | G06F 21/31 |
| 10,097,513 B2* | 10/2018 | Barakat | ............ | H04L 63/00 |
| 2016/0014004 A1* | 1/2016 | Bergeron | ............ | H04L 47/196 |
| | | | | 709/224 |

* cited by examiner

METHODS, SYSTEMS, AND COMPUTER READABLE MEDIA FOR INCREASING THE RATE OF ESTABLISHED NETWORK CONNECTIONS IN A TEST SIMULATION ENVIRONMENT

TECHNICAL FIELD

The subject matter described herein relates to establishing simulated session connections in a test simulation environment. More particularly, the subject matter described herein relates to methods, systems, and computer readable media for increasing the rate of established network connections in a test simulation environment.

BACKGROUND

At present, RSA key generation is an integral part of the secure socket layer (SSL) connection establishment process. However, this key generation process accounts for a considerable amount of the computational load associated with the private key decryption processing. Specifically, the computational load associated private key decryption operation conducted by an emulated server is considerably disproportionate to the load subjected to an emulated client that is conducting public encryption processing. In light of this significant drawback, a large bottleneck occurs at the server entity responsible for executing the private key decryption operation. Thus, any reduction of time associated with the determination of encryption and decryption keys may be extremely beneficial for the sake of testing efficiency.

Thus, there exists a need for methods, systems, and computer readable media for increasing the rate of established network connections in a test simulation environment.

SUMMARY

Methods, systems, and computer readable media for increasing the rate of established network connections in a test simulation environment are disclosed. In some embodiments, a method includes Methods, systems, and computer readable media for increasing the rate of established network connections in a test simulation environment are disclosed. The method includes generating, by a network equipment test device in a test simulation environment, a random integer. The method further includes designating the generated random integer as a first twin prime value in the event the generated random integer is a prime number and designating, by the network equipment test device, a generated sum of the first twin prime value and a designated value as a second twin prime value in the event the generated sum is a prime number. The method also includes generating a custom key certificate pair that includes a public encryption key and a private decryption key using the first twin prime value and the second twin prime value and decrypting at least one message received from a device under test using the private decryption key.

The subject matter described herein for enhancing network connection rates in a test simulation environment may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by a hardware based processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
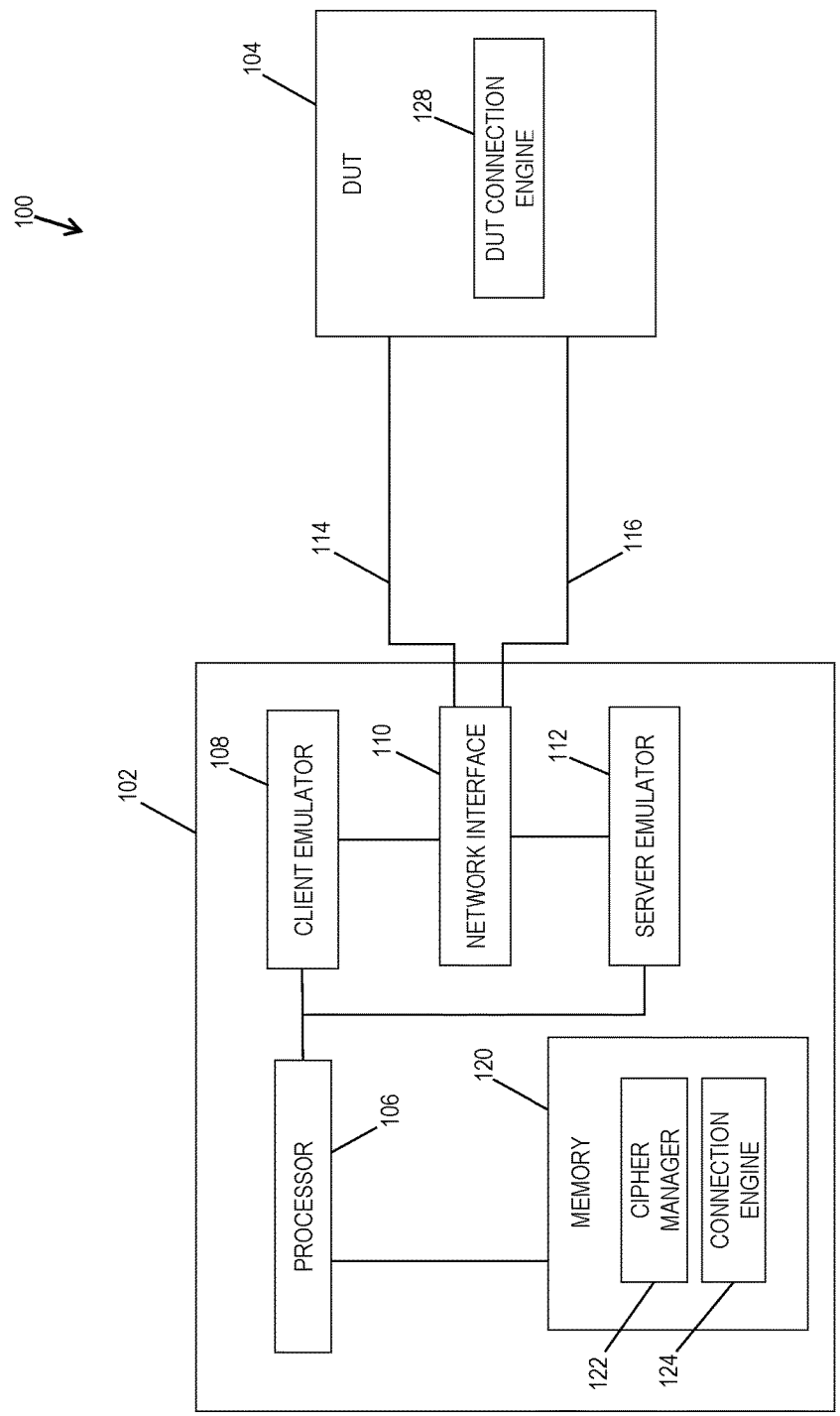
FIG. 1 illustrates a block diagram of an exemplary system for increasing the rate of established network connections in a test simulation environment according to an embodiment of the subject matter described herein.

Methods, systems, and computer readable media for increasing the rate of established network connections in a test simulation environment are disclosed. In some embodiments, the present subject matter involves the determination, by a network equipment test device, of twin prime values that are utilized to generate a custom key exchange pair comprising cryptographic keys for use in a test simulation session within a testing environment. Notably, the present subject matter affords the distribution of the computational load associated with a server entity or device that is tasked to decrypt a client key exchange message received from a device under test for the purpose of increasing the number of SSL connections that can be established within a test simulation environment. As used herein, SSL may be used to refer to the secure socket layer protocol and/or the transport security layer (TSL) protocols.

Notably, many networking security devices are required by customer demand to measure the speed in which new TCP/SSL connections per second for different SSL key-certificate sizes can be established for a variety of testing reasons, such as performing SSL deep inspection, simulate a "man-in-the middle" attack, or the like. In order to test these network security devices, local ports on a network equipment test device may be configured to function as both a client (i.e., an emulated client) and a server (i.e., an emulated server). As such, a network security device under test (DUT), which is communicatively connected to the network equipment test device, can be configured to handle at least two SSL connections. Namely, one SSL connection that is initiated by the emulated client and another SSL connection in which the DUT has initiated with the emulated server. Since RSA cipher suites are being while conducting an SSL handshake, the server is required to decrypt the client key exchange message from a DUT using its own private decryption key in order to retrieve a symmetric key and/or a pre-master secret (which will be used to encrypt the communicated end-user data). In particular, the use of the private decryption key to decrypt the client key exchange message places a significant computational load on the emulated server and imposes a processing bottleneck on that server entity. This processing bottleneck is the primary the reason that a DUT achieves a lower number of SSL connections per second in a test environment. Notably, achieving a greater number SSL connections per second is a key goal for any security test solution.

The disclosed subject matter affords a method of enhancing SSL connections per second performance by generating a custom key certificate pair wherein twin prime values 'q' and 'p' (where p=q+2) are selected and designated by a cipher manager as the RSA prime values. Notably, this pair of twin prime values is strategically selected such that the RSA public modulus, 'n,' is equal to the product of the twin prime values, i.e., n=q(q+2)). The selection and designation of the twin prime values as RSA prime values enables a significant reduction of the computational load that is subjected on an emulated server and thereby increases the SSL connection per second performance between a DUT and the emulated server in a test environment. One technical advantage of the disclosed approach is that the custom key certificate pair, which is based on the selected twin prime values may be utilized as input to the RSA algorithm. In particular, a custom key certificate pair that is generated using the selected twin prime values is processed like any other key-certificate pair. Namely, the RSA algorithm does not require any software code modification in order to receive the custom key certificate pair.

As indicated above, the RSA algorithm typically specifies that two large prime numbers identified as 'p' and 'q' are selected. The RSA algorithm, which may be executed by a cipher manager, subsequently computes an RSA public modulus 'n' by determining the product of 'p' and 'q' (e.g., n=p*q) (e.g., step A). Next, the RSA key size, which is determined by the number of bits in 'n', is calculated. In particular, the RSA key size is determined by the size of 'n' in bits, or more specifically, the number of bits that is needed to represent the decimal value of 'n' in a binary number system. This value may be represented by the parameter, 'length_in_binary(n)'. The RSA algorithm subsequently computes Φ(n), which is equal to the product of (p−1) and (q−1) (e.g., step B). After calculating Φ(n), a public exponent represented by the integer 'e' is selected such that such that i) 1<e<Φ(n) and ii) the greatest common denominator (GCD) of (e, Φ(n))=1 (e.g., step C). After 'e' is selected, a private exponent represented by the value 'd' is computed such that e*d=1 mod(Φ(n)) (i.e., d=[1 mod(Φ(n))]/e) (e.g., step D).

After computing these values (e.g., steps A-D), the RSA algorithm generates a public encryption key (e, n) and a private decryption key (d, n). In a live network environment, client key exchange messages that are sent by a client are encrypted by the client using a public key of a server. Further, client key exchange messages received by the server will be decrypted by the server using the server's private decryption key. The RSA algorithm may be used to perform public key based encryption of a message 'm' to be sent to a receiving entity (e.g., the server) using the formula c=m$^e$ mod(n), where 'c' represents the cipher or encrypted message. Similarly, decryption of the encrypted message is performed by the receiving entity using the formula m=c$^d$ mod(n) in order to retrieve the original message 'm.'

As an example, the public exponent 'e' equal to 65537, which amounts to 17 bits long (i.e., length_in_binary (65537)=17), may be selected by a server entity. Notably, this value is typically minimized in length in order to promote computational efficiency, since the public encryption is oftentimes performed by a browser and/or a computing device with significantly low processing power (as compared to a server device). Since 'e' amounts to a size of 17 bits, the size of 'd' bitwise will be very close to the size of 'n' in the binary number system. More specifically, since 'e' has significantly few bits than the public modulus 'n', the length_in_binary(d) is therefore nearly equal to length_in_binary(n)). Notably, each of RSA public encryption and RSA private decryption involves modular exponentiation with respect to the RSA public modulus 'n'. Modular exponentiation can be conducted by a cipher manager configured to execute a bit scanning algorithm. Notably, the cipher manager is configured to scan an exponent value in a bitwise manner, and if 'k' represents the number of bits in the exponent, then the computational cost of modular exponentiation for any number of bits is proportional to k$^3$. For a private key based decryption operation, the exponent scanned by the cipher manager is 'd' while for a public key based encryption operation, the exponent scanned by the cipher manager is 'e'. Thus, since exponent 'd' is considerably larger in size (bitwise) than exponent 'e', the computational cost of private decryption, which is proportional to (length_in_binary(d))$^3$ is significantly greater than the computational cost of public encryption, which is proportional to (length_in_binary(e))$^3$.

Moreover, the efficient implementation of RSA private decryption is accomplished by a cipher manager using the Chinese Remainder Theorem (CRT). Notably, utilization of CRT is possible by a server entity since the factors of n (i.e., prime values 'p' and 'q') are known. For example, CRT can be performed by precomputing values dP, dQ, and q$^{-1}$ in the event p>q and n=p*q. Notably, a cipher manager can calculate and designate 'dP' as being equal to 'd*mod(p−1)' and dQ as being equal to 'd*mod(q−1)'. A cipher manager further calculates and designates q$^{-1}$, such that q*q$^{-1}$=1 mod p. In order to compute the message 'm' (given the cipher c), a cipher manager is configured to execute and designate m1=c$^{dP}$ mod(p) and m2=c$^{dQ}$ mod(q), where m1 and m2 are mathematical variables defined to help facilitate the CRT application in RSA private decryption (e.g., assist with reconstructing the message back from the cipher). Further, a cipher manager subsequently utilizes the computed values to calculate, 'h' (which is another defined mathematical variable that helps facilitate the CRT application in RSA private decryption). Specifically, a cipher manger determines h=q$^{-1}$*(m1−m2) mod (p). Upon determining h, the cipher manager obtains message 'm' by calculating m2−h*q.

Consequently, if 'x' is designated by a cipher manager to represent the number of bits in n (e.g., x=length_in_binary (n)), then each of primes values p and q is equal to approximately the size of x/2 bits. Thus, the size of dP and dQ, at most, will each be equal to x/2 bits. As such, computational cost of computing each of m1 and m2 will be approximately proportional to x$^3$/8. Since the size of the exponent in the computation of m1 and m2 is approximately half that of 'n,' a cipher manager's computation for each of m1 and m2 is much faster than decrypting the cipher using the public exponent and modulus.

FIG. 1 is a block diagram illustrating an exemplary architecture for a test simulation system 100 according to an embodiment of the subject matter described herein. Referring to FIG. 1, test simulation system 100 includes a network equipment test device 102 that is communicatively connected to a device under test (DUT) 104 in a test simulation environment. For example, network equipment test device 102 may be communicatively connected to DUT 104 via a wired connection or a wireless connection that facilitates the communication and/or transfer of encrypted packet traffic. In some embodiments, DUT 104 may include a serving gateway (SGW), a packet data network gateway (PGW), a firewall device, a router device, a network address translation (NAT) device, or any device or system that may benefit from high throughput traffic simulation testing.

In some embodiments, network equipment test device 102 may include a hardware based device or equipment that is configured to generate and send packet traffic to DUT 104 via established SSL connections and/or TLS connection for load testing purposes. In some embodiments, network equipment test device 102 may include a processor 106, a client emulator 108, a network interface unit 110, a server emulator 112, and memory 120, which includes a cipher manager 122 and a connection engine 124.

In some embodiments, cipher manager 122 is the module in network equipment test device 102 that is responsible for determining twin prime values, generating a custom certificate key pair based on the twin prime values, executing the RSA algorithm, performing bit scanning functions, and handling the CRT functionality. For example, cipher manager 122 is further configured to conduct the private decryption processing considerably faster by strategically selecting and designating the twin prime values of 'p' and 'q.' In a test simulation scenario where network equipment test device 102 is configured to test the SSL connection establishment performance of DUT 104, there is no requirement to restrict parameter 'e' to as small as 65537 (referring to the example above), thereby stressing DUT 104 to a lesser degree. Notably, a device such as DUT 104 typically possesses more computational processing power that can readily process the computational load (e.g., the processing required to conduct modular exponentiation with respect to the size of an exponent in bits) typically associated with public key encryption (e.g., as opposed to a typical browser application). Thus, instead of subjecting DUT 104 (which is functioning as the encryption entity) and server emulator 112 (which is functioning as the decryption entity) to unnecessarily uneven computational loads, cipher manager 122 may select twin prime values so that exponents 'e' and 'd' are ultimately selected with nearly the same size while yet satisfying all of the aforementioned steps (i.e., steps A-D) associated with conducting the RSA algorithm. By achieving this symmetric computation load, cipher manager 122 may be configured to ensure that the computational cost of conducting one public encryption operation is commensurate with the computational cost of one private decryption operation. Notably, cipher manager 122 is configured to ensure that the computational performance exhibited by network equipment test device 102 and/or server emulator 112 never lags behind the DUT's computational performance. Accordingly, cipher manager 122 is able to maintain a high connection per second rate that stresses an SSL connection engine 128 (which is responsible for establishing SSL connections) of DUT 104.

Processor 106 may include at least one central processing unit (CPU), microcontroller, or any other hardware based processor unit that configured to manage and facilitate the operation of cipher manager 122 and connection engine 124 in network equipment test device 102. Processor 106 may also include memory and various circuits, software and/or interfaces for providing the functionality and features described herein. In some embodiments, network equipment test device 102 may utilize client emulator 108 to function as a client entity with respect to DUT 104 (i.e., generate and send requests to DUT 104). Similarly, network equipment test device 102 may utilize server emulator 112 to function as a server entity with respect to DUT 104 (i.e., receive and service requests received from DUT 104).

In some embodiments, server emulator 112 may be configured to generate packet traffic, such as audio traffic data, video traffic data, and other multimedia data. Further, server emulator 112 may be configured to generate real-time transport protocol (RTP) data that is sent to DUT 104. In some embodiments, server emulator 112 may be configured to encrypt the generated packet traffic data being transmitted over an established SSL session connection. SSL session connections may be established between device 102 and DUT 104 via the handshaking procedure described below and depicted in FIG. 3. Packet traffic that is generated and encrypted by either client emulator 108 or server emulator 112 is initially forwarded to network interface unit 110 prior to its transmission to DUT 104 via connections 114-116 (e.g., an SSL connection). Although FIG. 1 only depicts a connections 114-116, additional connections existing between network equipment test device 102 and DUT 104 may be established without departing from the scope of the present subject matter.

In some embodiments, network interface unit 110 may convert the outgoing test packet traffic from server emulator 112 into an electrical, optical, or wireless signal format that is needed to transmit the test traffic to DUT 104 via a wire link, an optical fiber, a wireless link, or some other communications link. Similarly, network interface unit 110 may receive electrical, optical, or wireless signals from DUT 104 over one or more session connections 114-116 and may be configured to convert the received signals (e.g., packets) into incoming test traffic in a format usable by network equipment test device 102. Received packets may be directed to either client emulator 108 or server emulator 112 by network interface unit 110. For example, server emulator 112 may receive the incoming test traffic requested from DUT 104 via network interface unit 110. In some embodiments, server emulator 112 may also be configured to decrypt packet traffic originating from DUT 104.

In some embodiments, network equipment test device 102 comprises a connection engine 124 that is configured to conduct the negotiation/handshaking process associated with establishing SSL connections in a test session. In some embodiments, the SSL based test session is conducted between network equipment test device 102 and DUT 104 at an application layer. For example, connection engine 124 may be used to communicate with a DUT connection engine 128 of DUT 104 (e.g., via network interface 110) to establish a plurality of SSL connections that may be used to communicate encrypted packet traffic. In some embodiments, server emulator 112 may be configured to conduct an SSL handshake process with DUT 104 in the event DUT 104 attempts to establish an SSL connection. An exemplary handshake procedure utilizing a custom key certificate pair generated from twin prime values determined by cipher manager 122 is described below and depicted in FIG. 3.

In some embodiments, cipher manager 122 may include various session parameters that may be utilized to establish an SSL session, such as a type of cryptographic suite to be used by cipher manager 122, a designation of a predefined number of bits for the public RSA modulus, a designation of a number/size of bits for each of the p and q twin prime values, and the like. More specifically, cipher manager 122 may be utilized to define the parameters for the custom key-certificate pair values to be generated by network equipment test device 102. For example, cipher manager 122 may be configured to determine and define twin prime values (e.g., p and q) to client emulator 108 and server emulator 112. Notably, cipher manager 122 may execute an algorithm (e.g., see FIG. 2 herein) to generate custom key-certificate pair using generated twin prime values. In some embodiments, cipher manager 122 may be accessed and programmed by a network operator, a test simulation administrator, or any other user that seeks to establish parameters for a traffic test simulation conducted between network equipment test device 102 and DUT 104.

Network equipment test device 102 further includes memory 120, which can comprise random access memory (RAM), read only memory (ROM), optical read/write memory, cache memory, magnetic read/write memory, flash memory, or any other non-transitory computer readable medium. In some embodiments, processor 106 and memory 120 can be used to execute and manage the operation of cipher manager 122) and connection engine 124 (which are stored in memory 120). In some embodiments, cipher manager 122 comprises an algorithm that, when executed by processor 106, performs the operations described in FIG. 2. Similarly, connection engine 124 may comprise an algorithm, when executed by processor 106, performs the operations described in FIG. 3.

Figure 2:
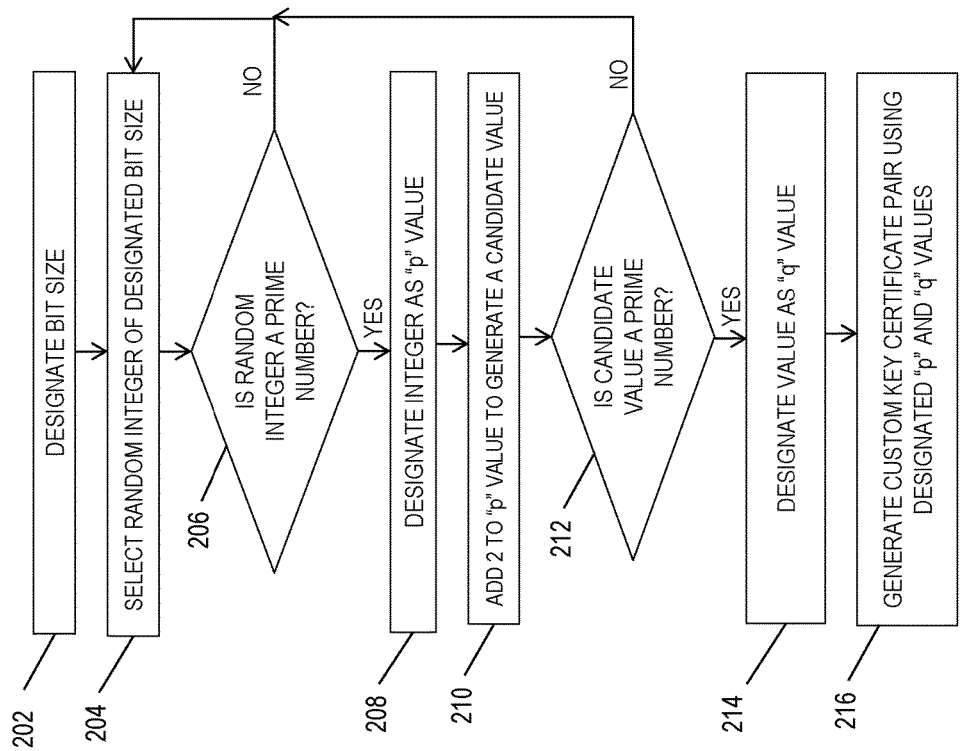
FIG. 2 illustrates a flow chart for generating a custom key certificate pair based on designated twin prime values according to an embodiment of the subject matter described herein.

FIG. 2 illustrates a flow chart for generating a custom key certificate pair based on designated twin prime values according to an embodiment of the subject matter described herein. For example, method 200 depicted in FIG. 2 may include an algorithm that is performed by cipher manager 122 when executed by processor 106 of device 102 (as shown in FIG. 1).

In step 202, cipher manager 122 designates a bit size for the each of the twin prime values. For purposes of illustration, cipher manager 122 may designate the bit size for each of 'p' and 'q' to be 512 bits long. In such a scenario, the RSA public modulus 'n' is may initially be designated by cipher manager 122 as 1024 bits in length.

In step 204, a random integer of the designated bit size is selected. In some embodiments, cipher manager 122 selects a random integer that is equal to the size determined in step 202. For example, cipher manager 122 may select a random number that is 512 bits in length.

In step 206, a determination as to whether the selected random integer (e.g., designated in step 204) is a prime number. More specifically, cipher manager 122 may be configured to ascertain whether the selected random integer is a prime number. If the random integer is a prime number, then method 200 proceeds to step 208. Otherwise, method 200 loops back to step 204.

In step 208, the prime random integer is designated as a 'q' twin prime value. For example, the random integer that is selected in step 204 and identified as a prime number in step 206 is designated by cipher manager 122 as 'q'.

In step 210, cipher manager 122 is configured to add "2" to the value of q to generate a twin prime candidate value. In some embodiments, cipher manager 122 may be configured to add any predefined value (e.g., a small value other than 2) to 'q' in order to generate a second twin prime candidate value.

In step 212, cipher manager 122 makes a determination as to whether the twin prime candidate value generated in step 210 is a prime number itself. If the twin prime candidate value is a prime number, then method 200 proceeds to step 214. Otherwise, method 200 loops back to step 204.

In step 214, cipher manager 122 identifies the twin prime candidate value as a prime number and subsequently designates the value as a twin prime 'p' value, wherein 'p' is equal to q plus the predefined value (e.g., p=q+2).

In step 216, cipher manager 122 utilizes the designated twin prime values 'q' and 'p' to generate a custom key certificate pair in accordance to the RSA algorithm. For example, cipher manager 122 utilizes the determined twin prime values as input into the RSA algorithm to calculate a public modulus 'n' and generate a public exponent ('e') and a private exponent ('d'). Cipher manager 122 may utilize this generated data to subsequently create the custom key certificate pair. Notably, cipher manager 122 generate a custom key certificate pair that includes a public encryption key for (e, n) and a private decryption key (d, n) in the manner described above. After generating the custom key certificate pair using method 200, cipher manager 122 to distribute the public encryption key and private decryption key to server emulator 112 (see FIG. 1). Upon receiving the public encryption key and private decryption key, server emulator 112 is now properly provisioned to establish one or more SSL connections initiated by DUT 104.

Using the algorithm described above and illustrates in FIG. 2, the set of twin primes can be used as RSA primes values. Namely, each of q and p=q+2 is determined and designated by cipher manager 122 to be a twin prime value, while n=q*(q+2) is determined by cipher manager 122 as the RSA public modulus. Accordingly, $\Phi(n)$ is determined by cipher manager 122 to be equal to $q^2-1$. Next, if cipher manager 122 selects 'e' in accordance to $1<e=q<\Phi(n)$, then step (C) of the RSA algorithm is satisfied since the GCD of $(q, q^2-1)=1$. In this example, $q*q=1 \mod(q^2-1)$ and thus, the private exponent 'd' is also determined by cipher manager 122 to be equal to q. Consequently, this results in 'e' and 'd' being of equal size bitwise. Since 'e'='d' bitwise, the computational cost of executing a bit scanning algorithm of modular exponentiation on each of 'e' and 'd' is respectively the same on the encrypting entity (e.g., DUT 104) and the decrypting entity (e.g., server emulator 112). While having 'e' and 'd' equal to each other in size is a significant disadvantage for security purposes in a real/live network environment, such a security drawback is immaterial in a testing environment. Rather, from a load testing perspective for conducting SSL connection tests within a test simulation environment, this configuration affords a technical advantage of load distribution while still complying with RSA principles/requirements.

In some embodiment, CRT implementation of RSA private decryption as performed by cipher manager 122 involves notable implications. Since cipher manager 122 has designated i) e=d=q and ii) p=q+2>q, cipher manager 122 also designates dQ=q mod(q-1)=1 in accordance to CRT. Similarly, cipher manager 122 designates dP=q mod(p-1)=q mod(q+1)=q. Consequently, $m2=c^1 \mod(q)$ and $m1=c^q \mod(p)$. As such, cipher manager 122 is configured to invoke the modular exponentiation algorithm only to compute 'm1,' which is computationally proportional to the size of the twin prime value 'q' in bits. Notably, the calculation of 'm2' does not require any modular exponentiation to be performed by cipher manager 122. This relationship demonstrates that the computational cost of private decryption via CRT implementation is approximately equal to the computational cost of public encryption. Accordingly, the computational costs of private decryption and public encryption are more evenly distributed between a client entity and a server entity in a test simulation environment.

Figure 3:
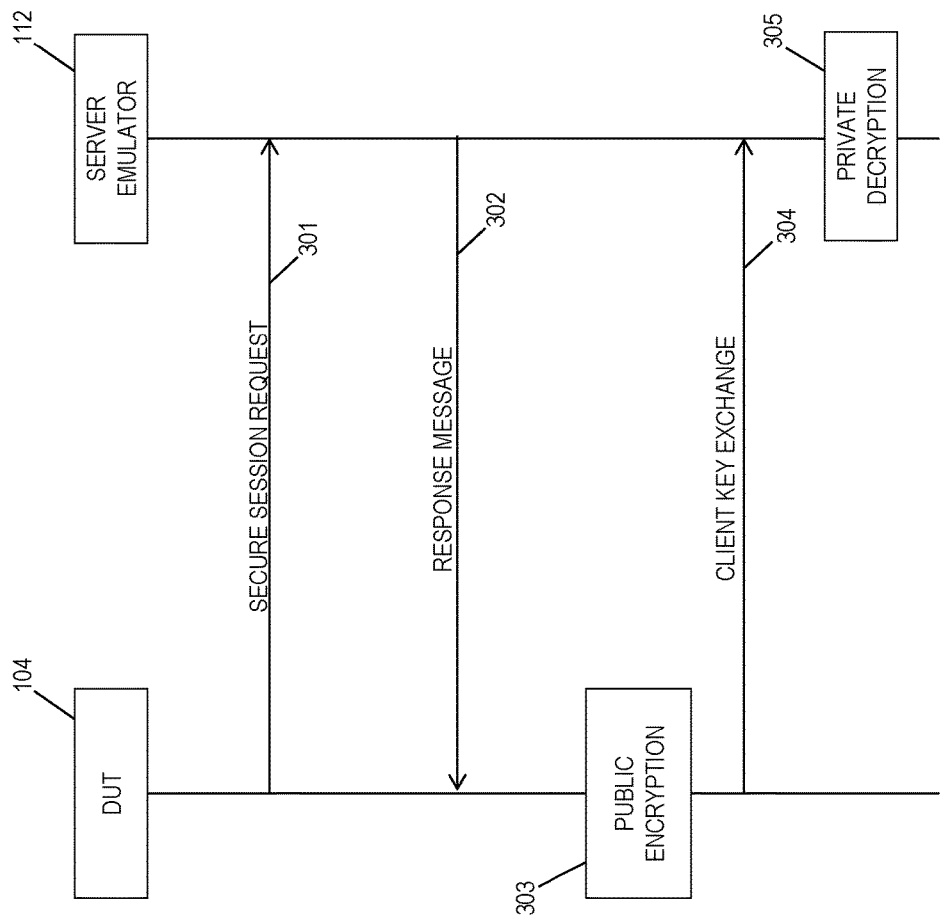
FIG. 3 illustrates an exemplary handshake procedure that utilizes a custom key certificate pair based on designated twin prime values according to an embodiment of the subject matter described herein.

FIG. 3 illustrates an exemplary handshake procedure utilizing a custom key certificate pair based on designated twin prime values according to an embodiment of the subject matter described herein. Referring to FIG. 3, DUT 104 may issue a secure session request message to server emulator 112 in order to initiate the establishment of an SSL connection. In reply, server emulator 112 sends a response message 302 that includes a digital certificate and the public encryption key (e.g., (e,n)) of server emulator 112. Notably, the public key provided to DUT 104 was previously generated using twin prime values determined and designated by device 102 (e.g., via the method 200 described in FIG. 2). In response to receiving message 302, DUT 104 may be configured to authenticate the digital certificate. Further, DUT 104 can utilize the received a public encryption key to encrypt a message that includes a random symmetric key (e.g., encrypting a message 'm' that results in an encrypted cipher message 'c') in block 303. DUT 104 subsequently sends the encrypted message to server emulator 112 via a client key exchange message 304. In response to receiving client key exchange message 304, server emulator 112 conducts the private decryption of the received encrypted message in block 305. Notably, server emulator 112 utilizes its own private key (e.g., (d, n)) which was generated using the twin prime values previously determined and designated by device 102 (e.g., via method 200 in FIG. 2). At this stage, both DUT 104 and server emulator 112 possess knowledge of the symmetric key and can encrypt end-user data communicated between the two devices using the symmetric key for the duration of the session.

Figure 4:
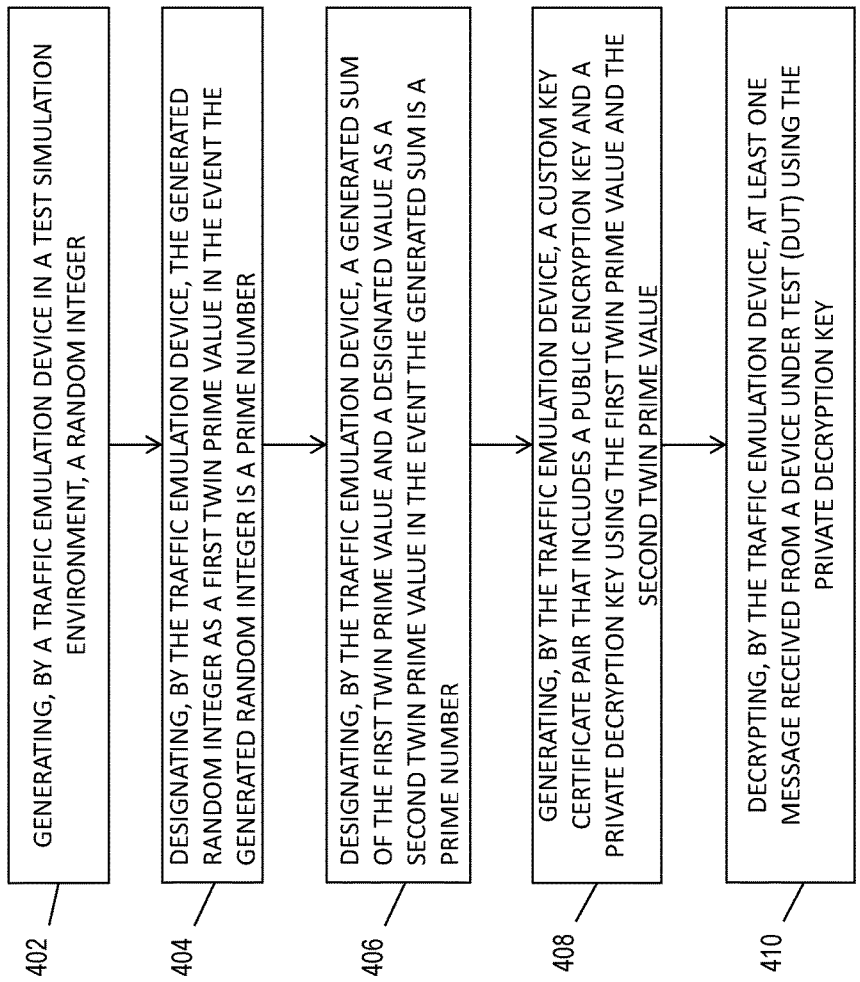
FIG. 4 illustrates a flow chart of a method for increasing the rate of established network connections in a test simulation environment according to an embodiment of the subject matter described herein.

FIG. 4 illustrates a flow chart of a method for increasing the rate of established network connections in a test simulation environment according to an embodiment of the subject matter described herein according to an embodiment of the subject matter described herein. In some embodiments, method 400 depicted in FIG. 4 comprise an algorithm performed by a cipher manager that is executed by a processor in network equipment test device 102. For example, in step 402, a random integer is generated by a network equipment test device in a test simulation environment. For example, the network equipment test device may comprise a cipher manager that includes a random number generator. In some embodiments, the cipher manager may be configured to generate the random integer of a specified bit size or length (e.g., 17 bits in length).

In step 404, the generated random integer is designated as a first twin prime value in the event the generated random integer is a prime number. In some embodiments, the cipher manager in the network equipment test device determines that the random integer constitutes a prime number. After making such a determination, the cipher manager designates the random integer as a first twin prime value.

In step 406, the sum of the first twin prime value and a designated value is designated as a second twin prime value in the event the generated sum is a prime number. In some embodiments, the cipher manager in the network equipment test device generates the sum of the first twin prime value (e.g., 'q') and a designated value (e.g., 2). After calculating the sum, the cipher manager determines whether the generated sum is a prime number itself. After making such determination, the cipher manager designates the sum as the second twin prime value.

In step 408, the custom key certificate pair is generated. In some examples, the cipher manager in the network equipment test device uses the first twin prime value and the second twin prime value to generate the custom key certificate pair. Notably, the generated custom key certificate pair includes a public encryption key and a private decryption key.

In step 410, at least one message received from the DUT is decrypted using the private decryption key. The cipher manager in the network equipment test device uses the private decryption key based on the twin prime values to conduct the decryption of messages received from the DUT in the manner described above.

It should be noted that network equipment test device 102, cipher manager 122, and/or functionality described herein may constitute a special purpose computing device. Further, network equipment test device 102, cipher manager 122, and/or functionality described herein can improve the technological field of encryption and decryption applications in a network testing environment. For example, by determining and generating twin prime values, private decryption may be performed more quickly, thereby achieving a rate of SSL connections per second within security test solution. Further, the approach facilitated by the disclosed system allows for the custom key-certificate pair (based on the twin prime values) to seamlessly work like any other key-certificate pair and does not require any additional coding or modification to be done.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   generating, by a network equipment test device in a test simulation environment, a random integer;
   designating, by the network equipment test device, the generated random integer as a first twin prime value in the event the generated random integer is a prime number;
   designating, by the network equipment test device, a generated sum of the first twin prime value and a designated value as a second twin prime value in the event the generated sum is a prime number;
   generating, by the network equipment test device, a custom key certificate pair that includes a public encryption key and a private decryption key using the first twin prime value and the second twin prime value, wherein the custom key certificate pair is generated by a cipher manager of the network equipment test device such that a public exponent of the public encryption key, a private exponent of the private encryption key, and the first twin prime value are equal; and
   decrypting, by the network equipment test device, at least one message received from a device under test (DUT) using the private decryption key.

2. The method of claim 1 wherein the designated value is equal to 2.

3. The method of claim 1 wherein the network equipment test device is coupled directly to the DUT in the test simulation environment.

4. The method of claim 1 wherein the network equipment test device sends a first set of packet traffic data to the DUT as a server entity and receives a second set of packet traffic data from the DUT as a client entity.

5. The method of claim 1 wherein the first twin prime value and the second twin prime value are utilized as inputs by an RSA algorithm to generate the public encryption key and the private decryption key.

6. The method of claim 1 wherein the message received from the DUT includes a client key exchange message.

7. The method of claim 1 including establishing an SSL connection using a symmetric key included in the at least one message.

8. A system comprising:
a network equipment test device in the test simulation environment configured for generating a random integer, designating the generated random integer as a first twin prime value in the event the generated random integer is a prime number, designating a determined sum of the first twin prime value and a designated value as a second twin prime value in the event the determined sum is a prime number, generating a custom key certificate pair that includes a public encryption key and a private decryption key using the first twin prime value and the second twin prime value, wherein the custom key certificate pair is generated by a cipher manager of the network equipment test device such that a public exponent of the public encryption key, a private exponent of the private encryption key, and the first twin prime value are equal, and decrypting at least one message received from a DUT using the private decryption key.

9. The system of claim 8 wherein the designated value is equal to 2.

10. The system of claim 8 wherein the network equipment test device is coupled directly to the DUT in the test simulation environment.

11. The system of claim 8 wherein the network equipment test device sends a first set of packet traffic data to the DUT as a server entity and receives a second set of packet traffic data from the DUT as a client entity.

12. The system of claim 8 wherein the first twin prime value and the second twin prime value are utilized as inputs by an RSA algorithm to generate the public encryption key and the private decryption key.

13. The system of claim 8 wherein the at least one message received from the DUT includes a client key exchange message.

14. The system of claim 8 wherein the network equipment test device establishes an SSL connection using a symmetric key included in the at least one message.

15. A non-transitory computer readable medium having stored thereon executable instructions that when executed by a processor of a computer control the computer to perform steps comprising:
generating, by a network equipment test device in a test simulation environment, a random integer;
designating, by the network equipment test device, the generated random integer as a first twin prime value in the event the generated random integer is a prime number;
designating, by the network equipment test device, a generated sum of the first twin prime value and a designated value as a second twin prime value in the event the generated sum is a prime number;
generating, by the network equipment test device, a custom key certificate pair that includes a public encryption key and a private decryption key using the first twin prime value and the second twin prime value, wherein the custom key certificate pair is generated by a cipher manager of the network equipment test device such that a public exponent of the public encryption key, a private exponent of the private encryption key, and the first twin prime value are equal; and
decrypting, by the network equipment test device, at least one message received from a device under test (DUT) using the private decryption key.

16. The non-transitory computer readable medium of claim 15 wherein the designated value is equal to 2.

17. The non-transitory computer readable medium of claim 15 wherein the network equipment test device is coupled directly to the DUT in the test simulation environment.

18. The non-transitory computer readable medium of claim 15 wherein the network equipment test device sends a first set of packet traffic data to the DUT as a server entity and receives a second set of packet traffic data from the DUT as a client entity.

19. The non-transitory computer readable medium of claim 15 wherein the first twin prime value and the second twin prime value are utilized as inputs by an RSA algorithm to generate the public encryption key and the private decryption key.

20. The non-transitory computer readable medium of claim 15 wherein the message received from the DUT includes a client key exchange message.

* * * * *